United States Patent
Tsuji

(10) Patent No.: US 10,467,047 B2
(45) Date of Patent: Nov. 5, 2019

(54) SERVER SYSTEM AND EXECUTION-FACILITATING METHOD

(71) Applicant: NEC Corporation, Tokyo (JP)

(72) Inventor: Atsushi Tsuji, Tokyo (JP)

(73) Assignee: NEC Corporatian, Tokyo (JP)

(*) Notice: Subject to any disclaimer, the term of this patent is extended or adjusted under 35 U.S.C. 154(b) by 0 days.

(21) Appl. No.: 15/448,940

(22) Filed: Mar. 3, 2017

(65) Prior Publication Data

US 2017/0255487 A1  Sep. 7, 2017

(30) Foreign Application Priority Data

Mar. 7, 2016 (JP) .................................. 2016-043432

(51) Int. Cl.
*G06F 9/455* (2018.01)
*G06F 9/48* (2006.01)
(Continued)

(52) U.S. Cl.
CPC .......... *G06F 9/4856* (2013.01); *G06F 3/0604* (2013.01); *G06F 3/065* (2013.01); *G06F 3/067* (2013.01); *G06F 3/0647* (2013.01); *G06F 8/60* (2013.01); *G06F 8/61* (2013.01); *G06F 9/45558* (2013.01); *G06F 9/4862* (2013.01);
(Continued)

(58) Field of Classification Search
None
See application file for complete search history.

(56) References Cited

U.S. PATENT DOCUMENTS

| 7,761,573 B2 * | 7/2010 | Travostino ............ G06F 9/4856 709/226 |
| 2012/0173653 A1 | 7/2012 | Bland et al. |
| 2013/0167147 A1 * | 6/2013 | Corrie ................. G06F 9/45558 718/1 |

FOREIGN PATENT DOCUMENTS

| EP | 2 043 320 A1 | 4/2009 |
| JP | 2009-122963 | 6/2009 |

(Continued)

OTHER PUBLICATIONS

Notification of Reasons for Refusal (Office Action) dated Nov. 7, 2017 in counterpart Japanese Patent Application No. 2016-043432.
(Continued)

*Primary Examiner* — Gregory A Kessler
(74) *Attorney, Agent, or Firm* — Finnegan, Henderson, Farabow, Garrett & Dunner, L.L.P.

(57) ABSTRACT

A server system includes an origin server acting as a source of deployment and at least one target server acting as a destination of deployment. The origin server further includes a virtual machine implementing an execution-facilitating process for facilitating the target server to deploy a predetermined program in an executable condition, and a migration part configured to migrate the virtual machine to the target server. After migration of the virtual machine from the origin server to the target server, the virtual machine carries out an execution-facilitating process for facilitating the origin server to deploy a predetermined program in an executable condition at least one time. This eliminates the necessity of providing a specific server dedicated to the execution-facilitating process, thus reducing the number of servers subjected to execution-facilitating processes.

4 Claims, 13 Drawing Sheets

(51) Int. Cl.
*G06F 3/06* (2006.01)
*G06F 8/60* (2018.01)
*G06F 8/61* (2018.01)
*G06F 9/50* (2006.01)
*H04L 29/08* (2006.01)

(52) U.S. Cl.
CPC .... G06F 9/5088 (2013.01); *G06F 2009/4557* (2013.01); *G06F 2009/45575* (2013.01); *H04L 67/10* (2013.01)

(56) References Cited

FOREIGN PATENT DOCUMENTS

| | | |
|---|---|---|
| JP | 2011-76370 | 4/2011 |
| JP | 2011-159249 | 8/2011 |
| JP | 2014-41414 | 3/2014 |
| JP | 2014-142720 | 8/2014 |
| JP | A-2015-8365 | 1/2015 |
| JP | 2016-4509 | 1/2016 |

OTHER PUBLICATIONS

Examiner's Comments issued by the Japanese Patent Office in counterpart Japanese Patent Application No. 2016-043432, dated Apr. 4, 2017.

\* cited by examiner

SERVER SYSTEM AND EXECUTION-FACILITATING METHOD

CROSS-REFERENCE TO RELATED APPLICATION

The present application claims the priority benefit of Japanese Patent Application No. 2016-43432 filed on Mar. 7, 2016, the subject matter of which is hereby incorporated herein by reference.

BACKGROUND OF THE INVENTION

1. Field of the Invention

The present invention relates to a server system integrating a plurality of servers and an execution-facilitating method for facilitating a plurality of servers in an executable condition to deploy programs using a virtual machine.

2. Description of Related Art

Recently, technologies concerning data transactions with a plurality of servers and virtual-machine migration have been developed by engineers. Herein, it is possible to employ a deployment method for deploying programs with a plurality of servers when carrying out data transactions. According to a deployment method, severs are controlled to deploy programs and placed in an executable condition by other devices.

As the related art, for example, it is possible to name six patent literatures (i.e. PLT 1 through PLT 6). PLT 1 discloses a deployment method for enabling servers having different hardware configurations to install OS deployment software. Herein, a management server compares an origin server (or a source server) and a target server (or a destination server) in terms of their hardware configurations so as to change a deployment method depending on a difference in hardware configurations. PLT 2 discloses a deployment system for initiating OS disk image files, applying security patches, and executing software deployment processes. PLT 3 discloses a virtual machine management method implementing live migration functions from one server to another server while sharing their data. PLT 4 discloses a virtual machine migration method for managing physical servers subjected to virtual-machine migration. PLT 5 discloses a method and a system for automatic and remote server provisioning using virtual machine appliances. PLT 6 discloses a virtual machine migration in fabric attached memory.

Among PLT 1 through PLT 6, PLT 3 and PLT 6 can be named as relevant arts closely resembling the basic concept of the present invention. Specifically, PLT 3 teaches a method for collecting information of a virtual machine without increasing loads in a management server. Herein, a management virtual machine collects and stores virtual-machine data of the first server with a common storage device. Upon completing data collection, the management virtual machine sends a collection completion notice to a management server and then carries out live migration from the first server to the second server while collecting and storing virtual-machine data of the second server with the common storage device. Thus, the management virtual machine collects virtual-machine data of servers subjected to management and migration. The management server reads data collected by the management virtual machine from the common storage device.

PLT 6 teaches a virtual machine migration method with respect to first and second servers. According to this method, the first server operates a virtual machine so as to access a virtual-machine image at a certain position of fabric attached memory through a network. The first server reads virtual-machine data thereof from its cache memory so as to provide virtual-machine data to the virtual-machine image, and therefore the first server is able to provide the second server with virtual-machine state information and memory address information. This may achieve migration from the first server to the second server. The second server accesses the virtual-machine image so as to operate a virtual machine thereon.

CITATION LIST

Patent Literature

PLT 1: Japanese Patent Application Publication No. 2009-122963

PLT 2: Japanese Patent Application Publication No. 2011-76370

PLT 3: Japanese Patent Application Publication No. 2011-159249

PLT 4: Japanese Patent Application Publication No. 2014-142720

PLT 5: European Patent Application Publication EP 2043320A1

PLT 6: U.S. Patent Application Publication US 2012/0173653A1

SUMMARY OF THE INVENTION

In the deploy process with a plurality of servers, it is necessary to carry out an execution-facilitating process for facilitating each server to deploy a predetermined program in an executable condition. For this reason, it is preferable to reduce the number of servers subjected to execution-facilitating processes, thus alleviating processing burdens among servers and reducing operating costs for servers.

The present invention aims to provide a server system that can reduce the number of servers necessary to achieve functions and an execution-facilitating method for reducing the number of servers subjected to execution-facilitating processes using a virtual machine.

In a first aspect of the invention, a server system includes a first server and at least one second server. The first server further includes a virtual machine implementing an execution-facilitating process for facilitating the second server to deploy a predetermined program in an executable condition, and a migration part configured to migrate the virtual machine to the second server. After migration of the virtual machine from the first server to the second server, the virtual machine carries out an execution-facilitating process for facilitating the first server to deploy a predetermined program in an executable condition at least one time.

In a second aspect of the invention, a server includes a virtual machine for carrying out an execution-facilitating process for facilitating at least one secondary server to deploy a predetermined program in an executable condition, and a migration part for migrating the virtual machine to the secondary server. After migration of the virtual machine to the secondary server, the virtual machine carries out an execution-facilitating process for facilitating the server to deploy a predetermined program in an executable condition at least one time.

In a third aspect of the invention, an execution-facilitating method is adapted to a server system including a first sever and at least one second server. The execution-facilitating method includes the steps of: executing a virtual machine with the first server; carrying out an execution-facilitating process for facilitating the second server to deploy a predetermined program in an executable condition with the virtual machine; migrating the virtual machine from the first server to the second server; after migration, operating the virtual machine to carry out an execution-facilitating process for facilitating the first server to deploy a predetermined program in an executable condition.

In a fourth aspect of the invention, a computer-readable storage medium is provided to cause a computer acting as a server to implement the execution-facilitating method.

According to the present invention, it is possible for a server system to reduce the number of servers subjected to execution-facilitating processes on a virtual machine by eliminating the necessity of providing a specific server dedicated to an execution-facilitating process.

DETAILED DESCRIPTION OF THE EMBODIMENT

Figure 1:
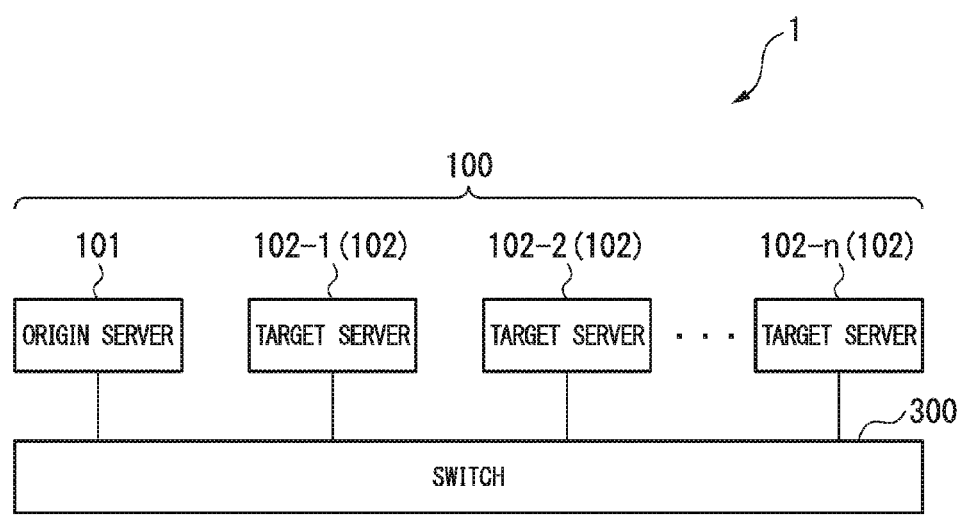
FIG. 1 is a block diagram of a computer system including a plurality of servers deploying programs on a virtual machine.

FIG. 1 is a block diagram of a computer system including a plurality of servers deploying programs on a virtual machine. The computer system 1 includes an origin server (or a source server) 101 and target servers (or destination servers) 102 (i.e. 102-1, 102-2, 102-$n$ where n≥3). In this connection, the computer system 1 may include a single target server, two or more target servers 102. For the sake of description, the origin sever 101 and the target server 102 are collectively referred to as servers 100. The servers 100 are connected together via a switch 300 so that they can communicate with each other.

For example, the computer system 1 is used to implement predetermined functions such as providing Web services. In the initial state, however, any programs for implementing predetermined functions are not installed in the origin server 101 and the target server(s) 102. Hereinafter, programs for implementing predetermined functions will be referred to as target programs.

To execute a target program, any one of the origin server 101 and the target servers 102 causes other servers to deploy the target program. Herein, the term "deploy" indicates an operation causing each server to deploy programs (or to install programs therein) so as to place each server in an executable condition with another device.

Specifically, the origin sever 101 implements a virtual machine acting as a deploy server so as to cause one or more target servers 102 to deploy a target program. In this connection, a virtual machine acting as a deploy server will be referred to as a deploy virtual machine.

The target program may include Operating System (OS). The deployment of the target program results in OS installation; hence, a virtual machine operating on the origin server 101 cannot cause the origin server 101 to deploy the target program. For this reason, it is necessary to carry out "migration" for moving a virtual machine from the origin server 101 to the target server 102 already deploying the target program. The virtual machine operating on the target server 102 causes the origin server 101 to deploy the target program, and therefore it is possible to deploy the target program on all the servers 100.

The target program may include programs for setting up virtual-machine executing environments. Thus, each of the servers 100 deploying the target program may allow for migration of a virtual machine.

As to the target program precluding an OS or the like, the origin server 101 may deploy the target program by itself. Alternatively, the origin server 101 may migrate a deploy virtual machine to the server 100 that has not already deployed the target program.

As described above, the servers 100 deploying target programs are each able to carry out predetermined functions. Among the servers 100, the origin server 101 is the first one that starts executing a deploy virtual machine and thereby causes the target servers 101 to deploy target programs. After migration of a virtual machine to the target server(s) 102, the origin server 101 is subject to receive (or deploy) a target program. As the claim language, the origin server 101 represents a first server.

The target servers 102 are subject to deploy target programs. At least one of the target servers 102 take over execution of a deploy virtual machine so as to cause other servers 100 (i.e. any servers 100 that has not deployed target programs) to deploy target programs. The origin server 101 is subject to deploy a target program by any one of the target servers 102. As the claim language, the target server(s) 102 represents a second server.

The switch 300 forms a communication network to replay communications among the servers 100. In this connection, the servers 100 do not necessarily carry out mutual communications using a single switch 300. For example, the servers 100 may communicate with each other through a LAN (Local Area Network) including a plurality of switches. Alternatively, the servers 100 may communicate with each other through the Internet.

In this connection, the computer system 1 may include a communication network for replaying communications among the servers 100. Alternatively, a communication network can be formed independently of the computer system 1. In FIG. 1, for example, the switch 300 may be formed independently of the computer system 1.

Figure 2:
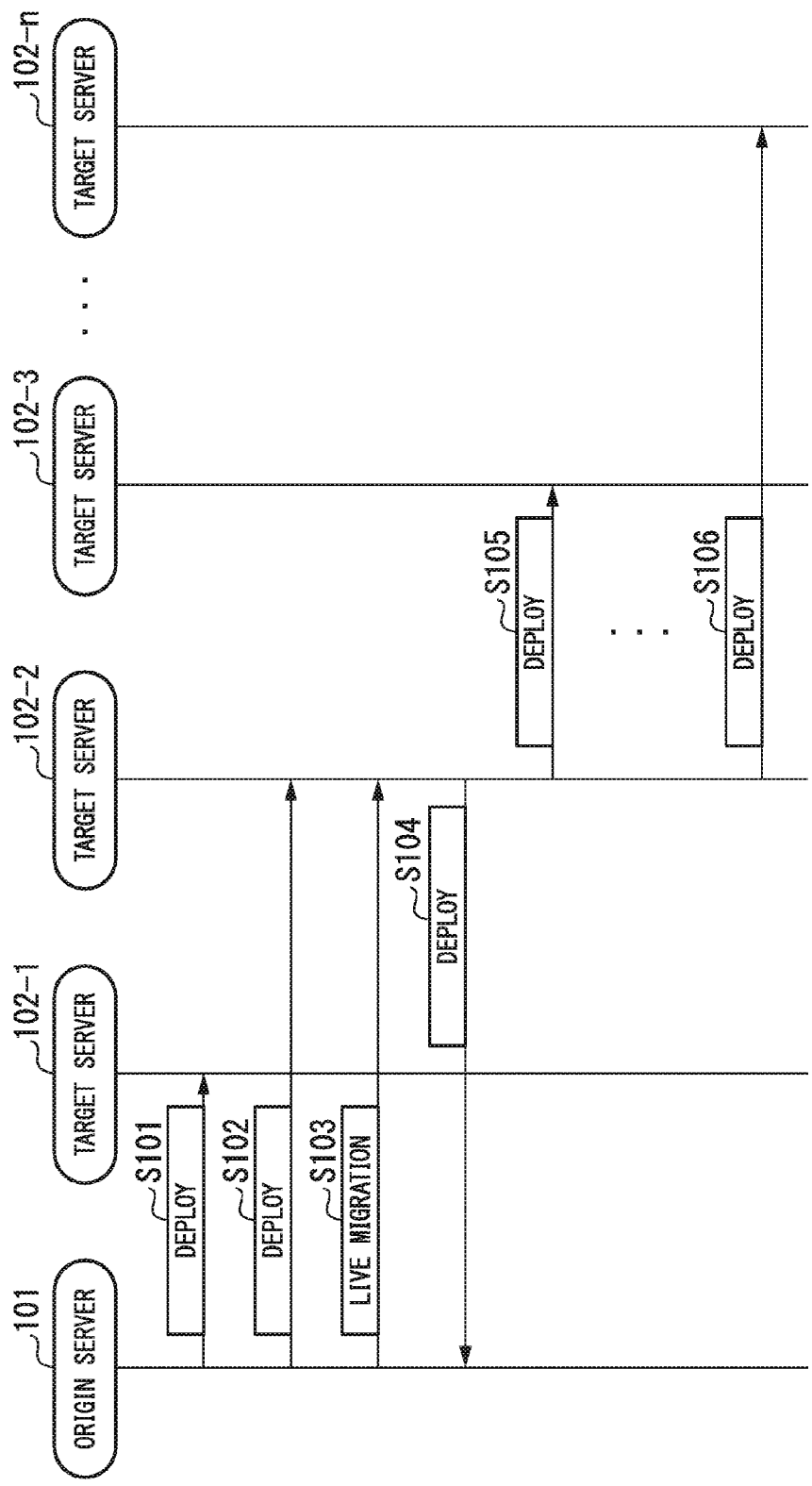
FIG. 2 is a sequence diagram showing a first example of processing that the computer system deploys target programs to servers.

FIG. 2 is a sequence diagram showing a first example of processing that the computer system 1 causes a plurality of servers 100 to deploy a target program. At first, the origin server 101 carries out a deploy virtual machine so as to deploy a target program to at least one target server 102. In steps S101 and S102, the origin server 101 deploys a target program to two target servers 102, i.e. the target servers 102-1 and 102-2.

In the present embodiment, the deployment of target programs involves an OS installation and the construction of a virtual-machine execution environment. Since the target-program deployment involves OS installation, the server device 100 involving deployment is unable to deploy a target program by itself. Since the target-program deployment involves the construction of a virtual-machine execution environment, the server 100 already subjected to deployment can be subject to migration of a virtual machine.

After deploying a target program to at least one target server 102, the origin server 101 migrates "a deploy virtual machine" to any one of the target servers 102 already deployed their target programs in step S103. In FIG. 2, the origin server 101 carries out live migration of "a deploy virtual machine" with the target server 102-2.

In this connection, the method of migrating a deploy virtual machine between the servers 100 is not necessarily limited to live migration. For example, the server 100 that tries to execute a deploy virtual machine temporarily stops the deploy virtual machine, and then the server 100 may migrates the temporarily-stopped deploy virtual machine to other servers 100.

The target server 102 (i.e. the target server 102-2) that takes over a deploy virtual machine from the origin server 101 deploys a target program to the origin server 101 in step S104. In addition, the target server 102 that takes over a deploy virtual machine from the origin server 101 deploys the target program to all the other target servers 102 (i.e. the target servers 102 that have not deployed their target programs) in steps S105 and S106. In FIG. 2, the target server 102-2 deploys the target program to the remaining target servers 102-3 through 102-*n* (where n>3).

As described above, migration of a deploy virtual machine is carried out one time, and therefore the target server 102 that takes over the deploy virtual machine from the origin server 101 may deploy the target program to all the remaining servers 100 (i.e. the servers 100 that have not deployed their target programs). In this case, the server 100 corresponding to a destination of a deploy virtual machine (e.g. the target server 102-2) may directly deploy the target program to the server 100 corresponding to a source of a deploy virtual machine (e.g. the origin server 101).

Figure 3:
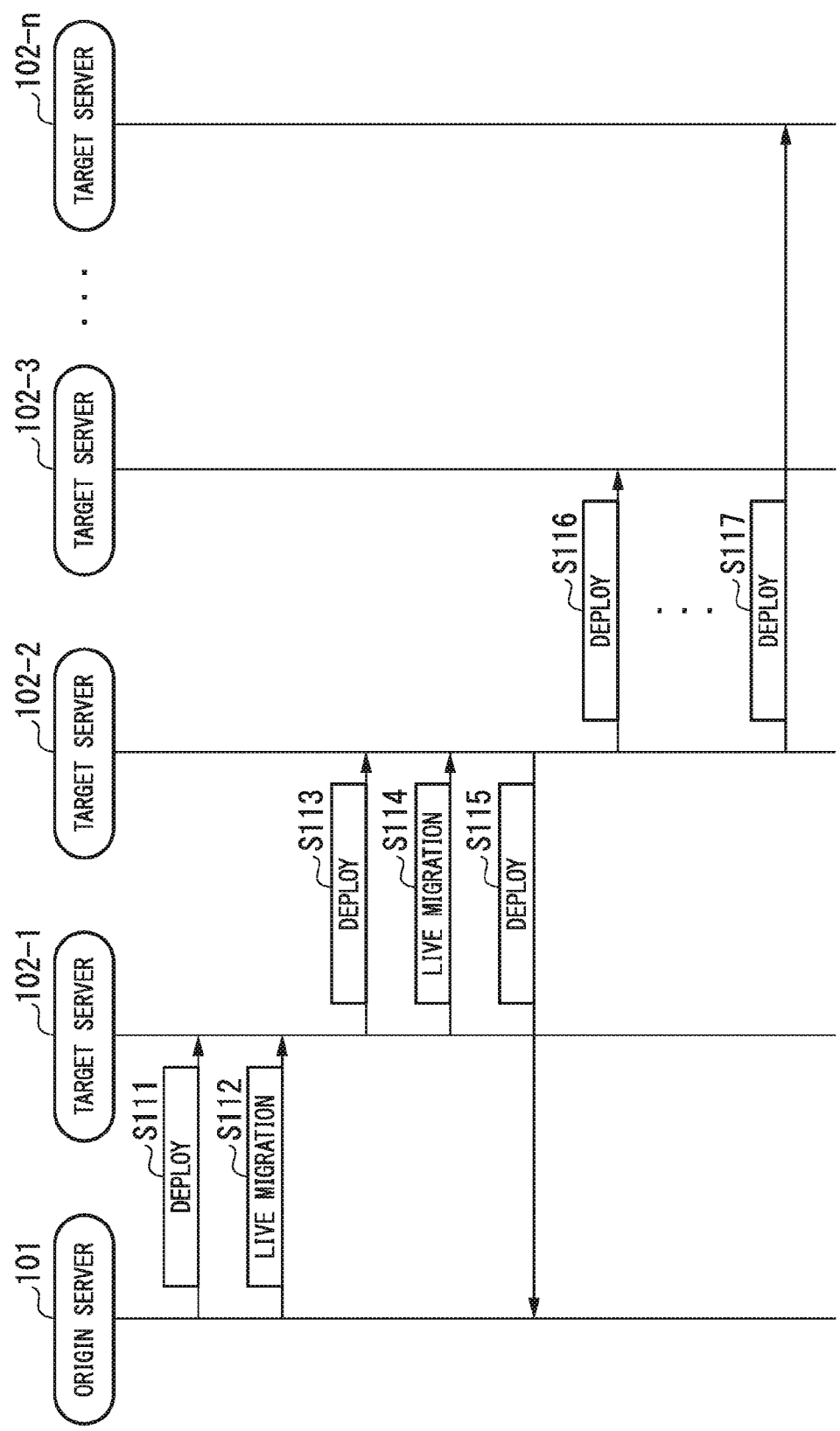
FIG. 3 is a sequence diagram showing a second example of processing that the computer system deploys target programs to servers.

FIG. 3 is a sequence diagram showing a second example of processing that the computer system 1 deploys target programs to servers 100. At first, the origin server 101 executes a deploy virtual machine so as to deploy a target program to at least one target server 102 in step S111. In FIG. 2, the origin server 101 deploys the target program to a single target server 102-1.

After deploying a target program to at least one target server 102, the origin server 101 carries out live migration of a deploy virtual machine to any one of the target servers 102 that have already deployed their target programs in step S112. In FIG. 3, the origin server 101 carries out live migration of a deploy virtual machine to the target server 102-2.

After taking over a deploy virtual machine from the origin server 101, the target server 102 (e.g. the target server 102-1) deploys a target program to at least one of the remaining target servers 102 in step S113. In FIG. 3, the target server 102-1 deploys the target program to the target server 102-2.

Next, the origin server 101 that takes over a deploy virtual machine from the origin server 101 migrates the deploy virtual machine to any one of the target servers 102 that have already deployed their target programs in step S114. In FIG. 3, the target server 102-1 carries out live migration of a deploy virtual machine to the target server 102-2.

The target server 102 that takes over a deploy virtual machine from the target server 102 deploys a target program to the origin server 101 in step S115. In addition, the target server 102 that takes over the deploy virtual machine from the target server 102 deploys the target program to all the remaining target servers 102 in step S116 through S117. In FIG. 3, the target server 102-2 deploys the target program to the target servers 102-3 through 102-*n* (where n>3).

Thus, migration of a deploy virtual machine is carried out two times or more, and therefore the target server 102 that takes over the deploy virtual machine from the origin server 101 may migrates the deploy virtual machine other target servers 102. In this case, the server 100 corresponding to a destination of a deploy virtual machine does not necessarily deploy a target program directly to the server 100 corresponding to a source of the deploy virtual machine. In FIG. 3, the target server 102-2 rather than the target server 102-1 deploys a target program to the origin server 101.

In this connection, the server 100 that has migrated a deploy virtual machine to other servers 100 may take over the deploy virtual machine again. For example, the origin server 101 subjected to deploy a target program may execute a deploy virtual machine again so as to deploy the target program to the remaining target servers 102.

In this connection, a plurality of servers 100 may concurrently deploy their target programs. In other words, the computer system 1 may deploy target programs by use of two or more deploy virtual machines. For example, the computer system 1 may include two or more origin servers 101. Alternatively, any one of servers 100 may copy a deploy virtual machine. When the computer system 1 carries out deployment of target programs using a single deploy virtual machine, it is easy for the computer system 1 to recognize the already-deployed servers 100 in comparison with a computer system using two or more deploy virtual machines.

Figure 4:
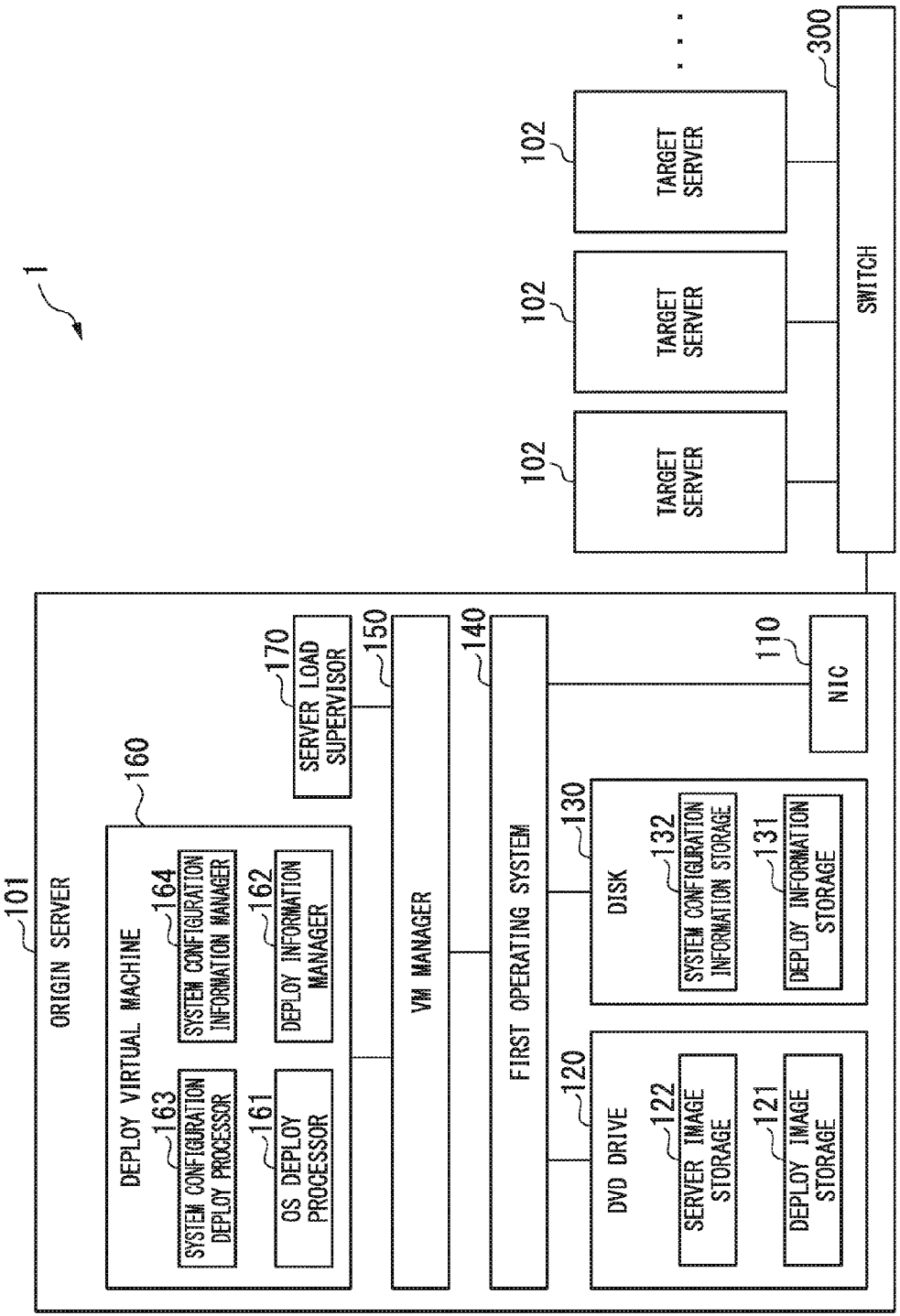
FIG. 4 is a block diagram showing an internal configuration of an origin server when starting to deploy a target program.

FIG. 4 is a block diagram showing an internal configuration of the origin server 101 when starting to deploy a target program. The origin server 101 includes an NIC (Network Interface Card) 110, a DVD (Digital Versatile Disk) drive 120, a disk 130, a first operating system 140, a VM manager 150, a deploy virtual machine 150, a deploy virtual machine 160, and a server load supervisor 170. The DVD drive 120 includes a deploy image storage part 121 and a server image storage part 122. The deploy virtual machine 160 includes an OS deploy processor 161, a deploy information manager 162, a system configuration deploy processor 163, and a system configuration information manager 164.

As shown in FIG. 1, the computer system 1 includes the origin server 101, the target servers 102, and the switch 300, wherein the origin server 101 and the target servers 102 communicate with each other via the switch 300.

The NIC 110 is an interface device used for communication with other devices through communication networks. The NIC 110 serves as a communication part of the server 100 (e.g. the origin server 101 in FIG. 4) having the NIC 110.

The DVD drive 120 is a drive unit that reads or writes data from/to a DVD inserted therein. In the present embodiment, the DVD drive 120 receives a DVD that stores data for configuring and operating a deploy virtual machine. In this connection, the DVD includes the deploy image storage part 121 and the server image storage part 122.

The deploy image storage part 121 is a storage area configured to store a deploy image, i.e. data used to start up the origin server 101 in an executable condition of a deploy virtual machine. The deploy image includes a program for the first operating system 140 and a program to run on the first operating system 140. In particular, the deploy image includes a program of the VM manager 150, a program of the deploy virtual machine 160, and a program of the server load supervisor 170.

The origin server 101 includes a CPU (Central Processing Unit) that reads and executes a program of the first operating system 140 and a program of the VM manager 150 from the deploy image storage part 121, thus implementing the first operating system 140 and the VM manager 150. This makes it possible to configure and execute a virtual machine. Then, the VM manager 150 reads and executes a program of the deploy virtual machine 160 from the deploy image storage part 121, thus configuring the deploy virtual machine 160. In addition, the CPU of the origin server 101 reads and executes a program of the server load supervisor 170 from the deploy image storage part 121 so as to configure the server load supervisor 170.

Concretely, any function part configured to read and execute programs may indicate any hardware element, implementing functions, configured to read and execute programs. For example, the VM manager 150 that reads and executes a program of the deploy virtual machine 160 is implemented using the CPU of the origin server 101. As one function of the VM manager 150, the CPU of the origin server 101 reads and executes a program of the deploy image storage part 121.

In the above, the origin server 101 may automatically set up its configurations. When a user inserts a DVD into the DVD drive 120, for example, the CPU of the origin server 101 automatically reads and executes programs from the DVD so as to set up the foregoing configuration.

The server image storage part 122 is a storage area configured to store a server image representative of data transmitted to the server 100 acting as a destination of deployment (i.e. the server 100 subjected to deployment). In FIG. 4, the server image storage part 122 stores a server image in advance. For example, a server image is a disk image, and therefore the server 100 acting as a destination of deployment receives a server image so as to directly copy the server image onto a disk. In particular, the server image includes OS-related programs and information for operating the OS. Due to the server image, the OS is installed in the server 100 acting as a destination of deployment.

The method for the origin server 101 to acquire a deploy image and a server image is not necessarily limited to the foregoing method using the DVD drive 120. For example, it is possible for the origin server 101 to be connected to an external hard-disk unit for storing a deploy image and a server image; hence, the origin server 101 may acquire the deploy image and the server image from the external hard-disk unit. Alternatively, it is possible for the origin server 101 to receive a deploy image and a server image from another device so as to store those images on a storage device such as a hard disk. In this method for acquiring a deploy image and a server image other than the foregoing method using the DVD drive 120 for the origin server 101, the origin server 101 is not necessarily equipped with the DVD drive 120.

The disk 130 is a hard disk installed in the server 100 (e.g. the origin server 101 in FIG. 4), which stores various types of information. The deploy information storage part 131 stores deploy information. The deploy information contains information relating to the OS that the deploy virtual machine 160 (i.e. the OS deploy processor 161) deploys to another server 100. For example, the deploy information storage part 131 stores deploy information containing some information needed for the OS to operate on the server 100 acting as a destination of deployment, such as an IP (Internet Protocol) address and a MAC (Media Access Control) address.

The system configuration information storage part 132 stores system configuration information. The system configuration information is information relating to a system program that the deploy virtual machine 160 (i.e. the system configuration deploy processor 163) deploys to another server 100. The system program is a program hierarchically higher than OS (or a program operable on OS). For example, the system program includes an application program that cause the computer system 1 to execute a target function for providing a Web service. For example, the system configuration information storage part 132 stores system configuration information including a configuration concerning a system program of the server 100 acting as a destination of deployment.

Any server 100 configured to store deploy information and system configuration information may act as a management server configured to manage the configuration of the computer system 1. The measure for the origin server 101 to store deploy information and system configuration information is not necessarily limited to the usage of the disk 130. For example, the origin server 101 may be equipped with a large-capacity semiconductor device for storing deploy information and system configuration information.

The first operating system 140 manages and operates constituent elements of the origin server 101. In particular, the first operating system 140 implements scheduling for allocating hardware resources and software resources to constituent elements.

The VM manager 150 acts as a virtual-machine platform (i.e. hypervisor) on the OS. In particular, the VM manager 150 sets up and operates a virtual machine while the VM manager 150 manages the operation of a virtual machine and the termination (or extinction) of a virtual machine.

In addition, the VM manager 150 carries out live migration of the deploy virtual machine 160 toward any one of the servers 100 which the deploy virtual machine 160 has deployed target programs to. In this connection, the live migration is an example of movement (or transition) of the deploy virtual machine 160, while the VM manager 150 represents a migration part embedded in the origin server 101.

The deploy virtual machine 160 is a virtual machine acting as a deploy server. Specifically, the deploy virtual machine 160 deploys a target program to another server 100 (i.e. the server 100 acting as a destination of deployment). Due to the deployment, the deploy virtual machine 160 facilitates the server 100 acting as a destination of deployment to deploy a target program in an executable condition. Herein, the target program is an example of a predetermined program, while the deploy virtual machine 160 represents a virtual machine.

The OS deploy processor 161 deploys OS to other servers 100. The deploy information manager 162 stores and manages deploy information, relating to the OS that the OS deploy processor 161 deploys to another server 100, on the deploy information storage part 131.

The system configuration deploy processor 163 deploys a system program to another device 100. Programs that the system configuration deploy processor 163 deploys to other servers 100 include a program realizing the VM manager 150. That is, the system configuration deploy processor 163 deploys the VM manager 150 to other servers 100. In addition, programs that the system configuration deploy processor 163 deploys to other servers 100 include a program realizing the server load supervisor 170. That is, the system configuration deploy processor 163 deploys the server load supervisor 170 to other servers 100.

The system configuration information manager 164 stores and manages system configuration information, relating to a system program that the system configuration deploy processor 163 deploys to other servers 100, on the system configuration information storage part 132. The server load supervisor 170 supervises loads of the server 100 having the server load supervisor 170.

Figure 5:
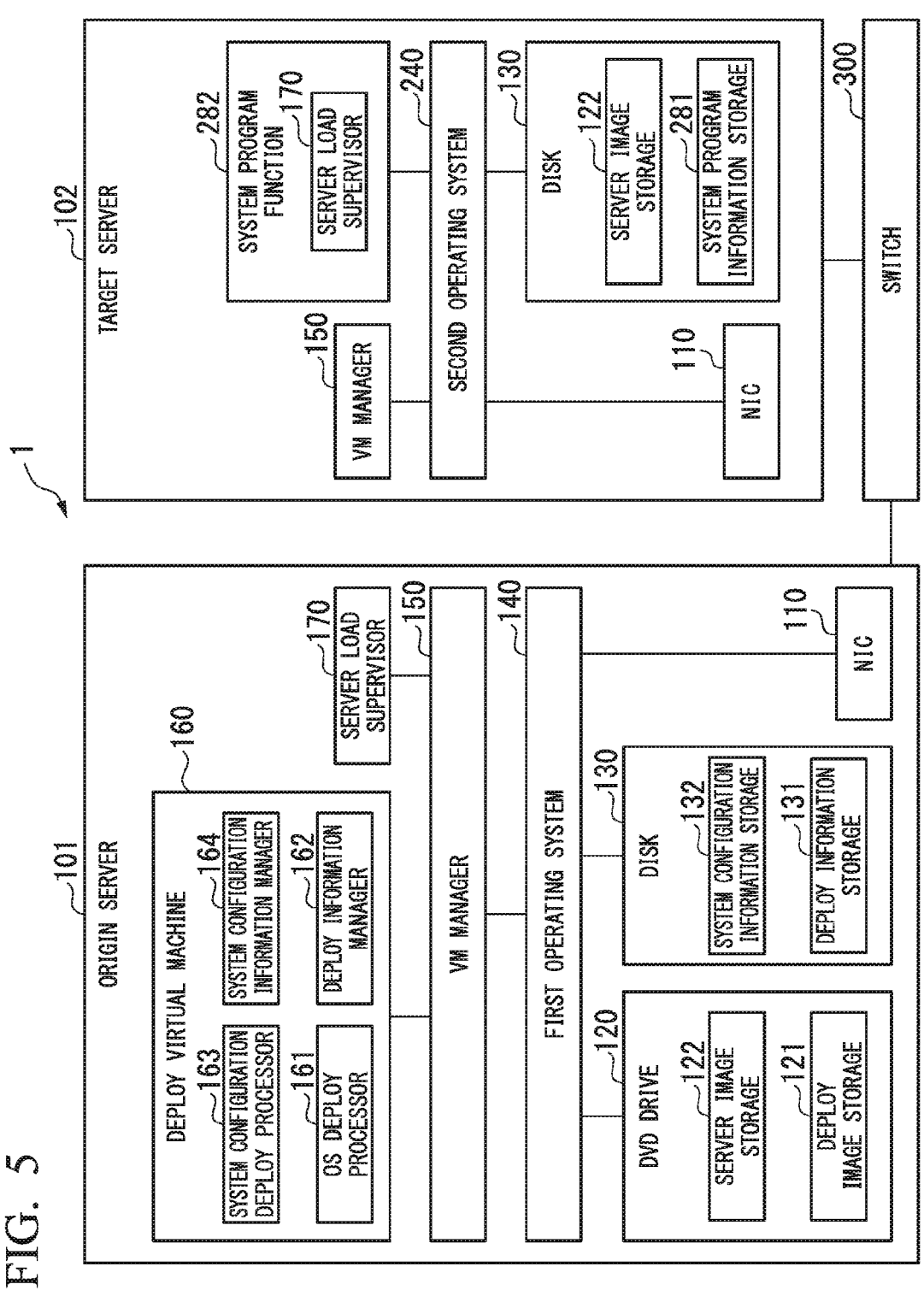
FIG. 5 is a block diagram showing an internal configuration of an origin server and an internal configuration of a target server when the origin server deploys a target program to the target server.

FIG. 5 is a block diagram of the origin server 101 and the target server 102 when the origin server 101 deploys a target program to the target server 102. In FIG. 5, the origin server 101 has the same configuration as the configuration of the origin server 101 shown in FIG. 4; hence, constituent elements thereof are denoted using the same reference signs, and therefore descriptions thereof will be omitted. The target server 102 includes an NIC 110, a disk 130, a VM manager 150, a second operating system 240, and a system program function part 282. The disk 130 includes a server image storage part 122 and a system program information storage part 281. The system program function part 282 includes a server load supervisor 170.

The target server 102 has the NIC 110 which is similar to the NIC 110 of the origin server 101.

The target server 102 has the disk 130 which is similar to the disk 130 of the origin server 101. In FIG. 5, the disk 130 of the target server 102 stores information different than the information stored on the disk 130 of the origin server 101. In the disk 130 of the target server 102, the server image storage part 122 stores server image while the system configuration information storage part 281 stores system configuration information.

In the origin server 101, the OS deploy processor 161 reds server image from the server image storage part 122 so as to transmit the server image to the target server 102 via the NIC 110. A CPU of the target server 102 stores the server image, transmitted from the origin server 101, on the disk 130. Thus, it is possible to configure the server image storage part 122 on the disk 130.

When the system configuration deploy processor 163 of the origin server 101 deploys a system program to the target server 102, the CPU of the target server 102 stores information, concerning the deployed system program, on the disk 130. Thus, it is possible to configure the system program information storage part 281 on the disk 130 of the target server 102. Hereinafter, the information stored on the system program information storage part 281 (i.e. the information concerning the deployed system program) will be referred to as system program information. For example, the system program information includes a configuration of the deployed system program.

Similar to the first operating system 140, the second operating system 240 manages and operates constituent elements of the server 100 (i.e. the target server 102 in FIG. 5). However, the second operating system 240 differs from the first operating system 140 in that the second operating system 240 is used continuously while the first operating system 140 is used temporarily. Specifically, the origin server 101 reads data from a DVD inserted into the DVD drive 120 so as to configure the first operating system 140; hence, the first operating system 140 is a temporary OS that is used until the DVD is ejected from the DVD drive 120. In contrast, the target server 102 reads data from the disk 130 so as to configure the second operating system 240; hence, the target server 102 continuously uses the second operating system 240 until reinstallation of OS is carried out. In the target server 102, the server image storage part 122 of the disk 130 stores the server image including information concerning the second operating system 240. At booting, the target server 102 is started by configuring the second operating system 240.

The target server 102 configures the VM manager 150 and the system program function part 282 by way of deployment. The target server 102 having the VM manager 150 may allow for migration of the deploy virtual machine 160. In addition, the target server 102 having the system program function part 282 is able to execute a predetermined function (e.g. providing a Web service).

Figure 6:
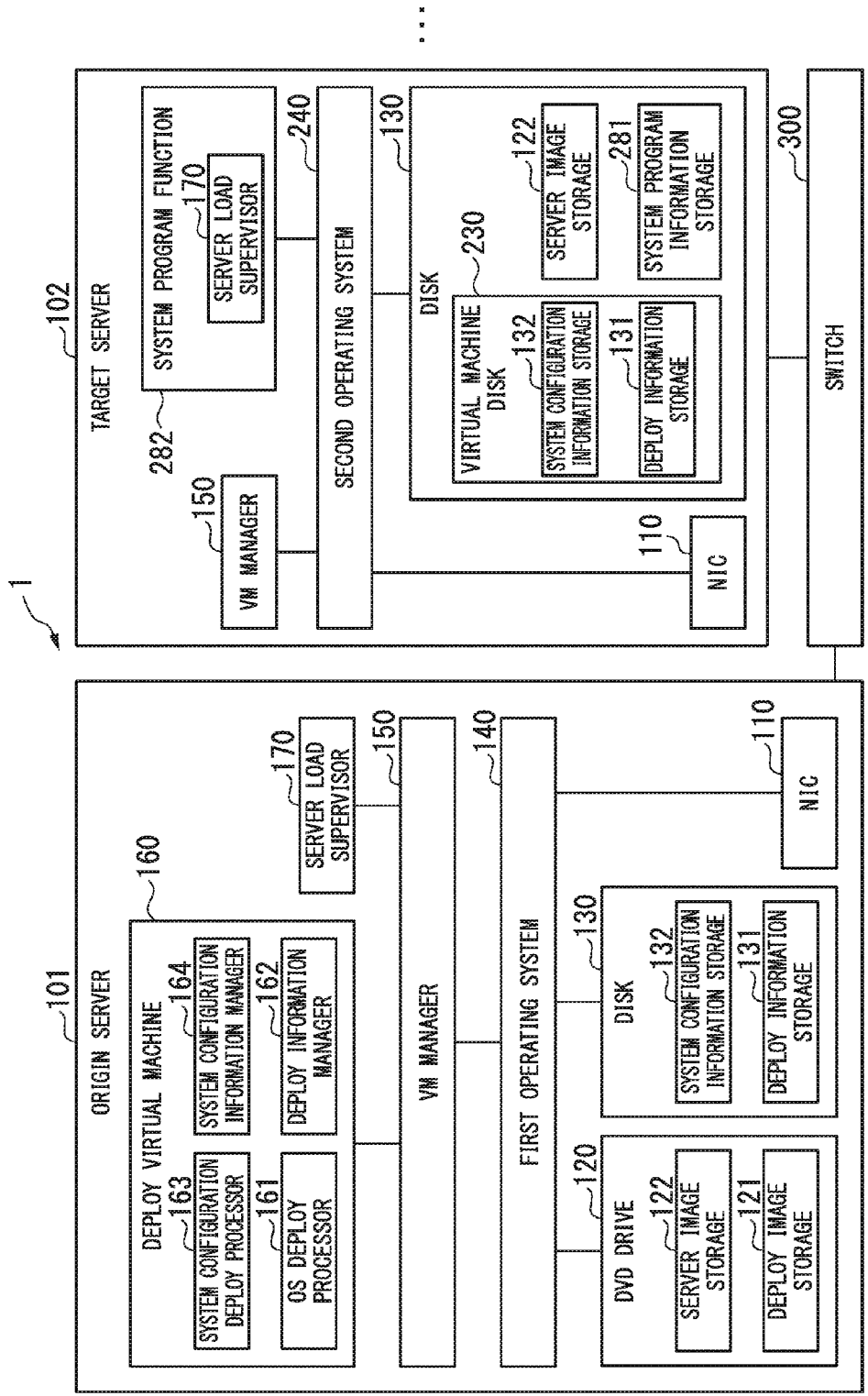
FIG. 6 is a block diagram showing an internal configuration of the origin server and an internal configuration of the target server in preprocessing of live migration that the origin server migrates a deploy virtual machine to the target server.

FIG. 6 is a block diagram showing an internal configuration of the origin server 101 and an internal configuration of the target server 102 in the preprocessing of the live migration that the origin server 101 migrates the deploy virtual machine 160 to the target server 102. In FIG. 6, the origin server 101 has the same constituent elements as those of the origin server 101 shown in FIG. 5; hence, those constituent elements are denoted using the same reference signs, and therefore descriptions thereof will be omitted. In FIG. 6, the target server 102 has the same constituent elements as those of the target server 102 shown in FIG. 5; hence, those constituent elements are denoted using the same reference signs, and therefore descriptions thereof will be omitted. Compared with the target server 102 of FIG. 5, the target server 102 of FIG. 6 further includes a virtual machine disk 230. The virtual machine disk 230 include a deploy information storage part 131 and a system configuration information storage part 132.

The virtual machine disk 230 is a virtual disk that copies the information used to execute the deploy virtual machine 160 from the disk 130 of the origin server 101. The virtual machine disk 230 includes the deploy information storage part 131 and the system configuration information storage part 132, which are configured by copying data from the deploy information storage part 131 and the system configuration information storage part 132 of the disk 130 of the origin server 101. The virtual machine disk 230 acts as a reference destination for the target server 102 to execute the deploy virtual machine 160. Since a reference destination for the target server 102 to execute the deploy virtual machine 160 is set inside the target server 102, it is possible to smoothly switch over a reference destination after the live migration of the deploy virtual machine 160.

Figure 7:
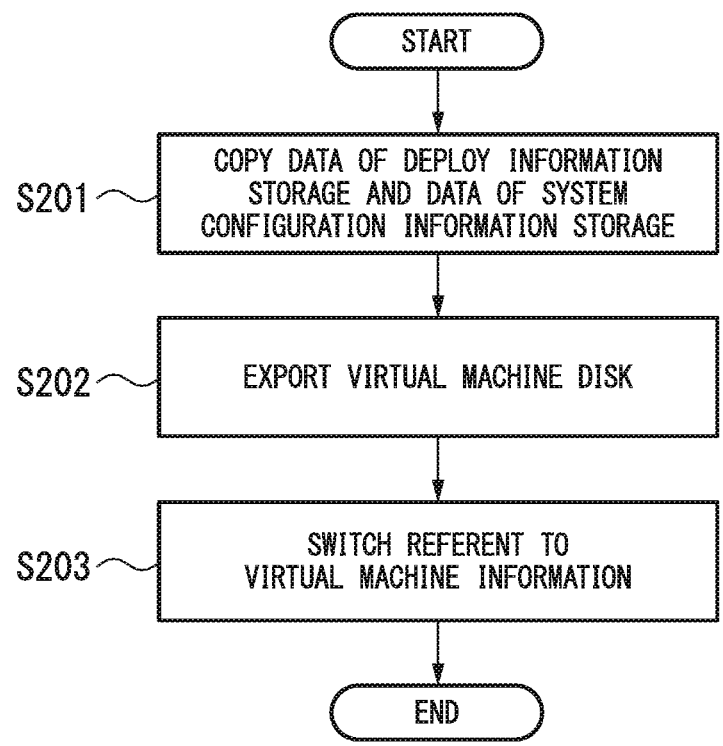
FIG. 7 is a flowchart showing the procedure for setting a destination for referring to data used to execute the deploy virtual machine inside the target server.

FIG. 7 is a flowchart showing the procedure for setting a destination for referring to data used to execute the deploy virtual machine 160 inside the target server 102. In step S201, the VM manager 150 of the origin server 101 cooperates with the VM manager 150 of the target server 102 so as to copy data of the deploy information storage part 131 and data of the system configuration information storage part 132 to the virtual machine disk 230.

Specifically, the VM manager 150 of the origin server 101 reads data from the deploy information storage part 131 and the system configuration information storage part 132 so as to transmit data to the target server 102 via the NIC 110. The VM manager 150 of the target server 102 stores data transmitted from the origin server 101, i.e. data of the deploy information storage part 131 and data of the system configuration information storage part 132, on the virtual machine disk 230. Due to step S201, it is possible to configure the deploy information storage part 131 and the system configuration information storage part 132 on the virtual machine disk 230.

Before the live migration of the deploy virtual machine 160, the VM manager 150 copies data used to execute the deploy virtual machine 160 from the source server 100 (i.e. the origin server 101) to the destination server 100 (i.e. the target server 102). As the claim language, the VM manager 150 represents a data copy part.

Next, the VM manager 150 of the target server 102 exports the virtual machine disk 230 to the origin server 101 in step S202.

Then, the VM manager 150 of the origin server 101 switches a reference destination, concerning the deploy virtual machine 101 currently executed by the origin server 101, from the disk 130 of the origin server 101 to the virtual machine disk 230 of the target server 102 in step S203. Thus, it is possible to update data of the virtual machine disk 230 depending on the operation of the deploy virtual machine 160 currently executed by the origin server 101.

As described above, the VM manager 150 changes its reference to data used to execute the deploy virtual machine 160 from data stored in the source server 100 (i.e. the origin server 101) to data copied to the destination server 100 (i.e. the target server 102). As the claim language, the VM manager 150 represents a reference switcher. After completion of step S203, the computer system 1 exits the process of FIG. 7.

In this connection, it is necessary to ensure consistency between the origin server 101 and the target server 102 in terms of data stored in the deploy information storage part 131 and the system configuration information storage part 132. In order to do so, the VM manager 150 of the origin server 101 needs to temporarily stop the operation of the deploy virtual machine 160. For this reason, it is possible for the VM manager 150 of the origin server 101 to stop the operation of the deploy virtual machine 160 in a time period counted from the timing of starting step S201 to the timing of ending step S203.

Alternatively, at the timing of starting step S201, the VM manager 150 of the origin server 101 may transmit differential information, concerning the updated data in the deploy information storage part 131 and the system configuration information storage part 132, to the target server 102 via the NIC 110. In this case, the VM manager 150 of the target server 102 needs to reflect differential information, given by the origin server 101, in the deploy information storage part 131 and the system configuration information storage part 132 of the target server 102.

By repeating transmission and reflection of differential information, it is possible to reduce data differences between the origin server 101 and the target server 102 with respect to the deploy information storage part 131 and the system configuration information storage part 132. Thereafter, the VM manager 150 of the origin server 101 stops the operation of the deploy virtual machine 160. After stopping the operation of the deploy virtual machine 160, the VM manager 150 of the origin server 101 continues to transmit differential information to the target server 102 so that the target server 102 continues to reflect differential information therein. Thus, it is possible for the target server 101 to match the origin server in terms of data of the deploy information storage part 131 and data of the system configuration information storage part 132.

After completion of step S203, the VM manager 150 of the origin server 101 resumes the operation of the deploy virtual machine 160. Thus, it is possible to comparatively reduce the stoppage period of the deploy virtual machine 160.

Figure 8:
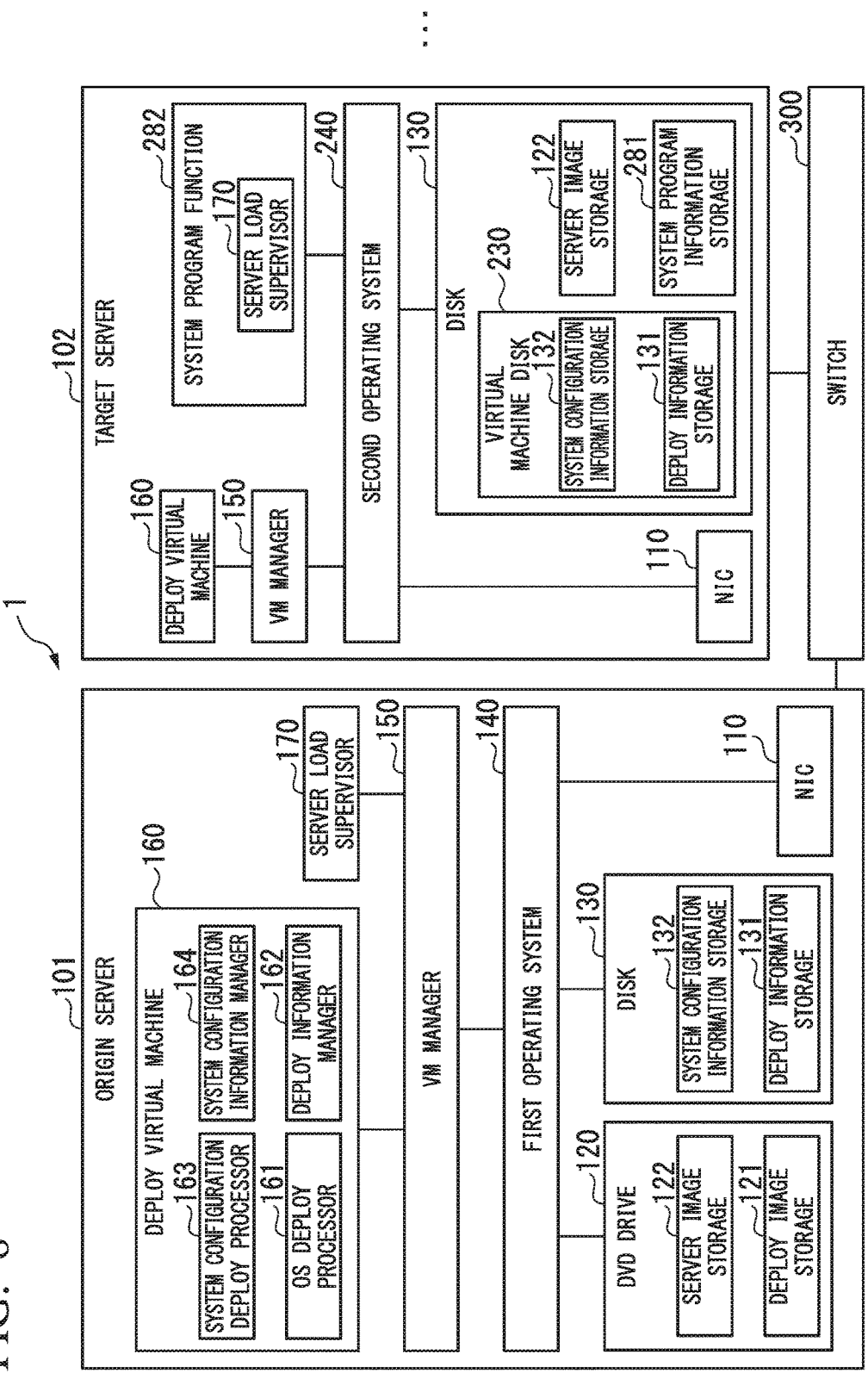
FIG. 8 is a block diagram showing an internal configuration of the origin server and an internal configuration of the target server after live migration that the origin server migrates the deploy virtual machine to the target server.

FIG. 8 is a block diagram showing an internal configuration of the origin server 101 and an internal configuration of the target server 102 after the live migration that the origin server 101 migrates the deploy virtual machine 160 to the target server 102. In FIG. 8, the origin server 101 has the same configuration as that of the origin server 101 shown in FIG. 6; hence, constituent elements thereof are denoted using the same reference signs, and therefore descriptions thereof will be omitted. In addition, the target server 102 of FIG. 8 has the same constituent elements as those of the target server 102 of FIG. 6; hence, those constituent elements are denoted using the same reference signs, and therefore descriptions thereof will be omitted. Compared with the target server 102 of FIG. 6, the target server 102 of FIG. 8 additionally includes a deploy virtual machine 160.

The deploy virtual machine 160 of the target server 102 is configured by way of the live migration from the origin server 101.

After establishing the configuration shown in FIG. 8, the origin server 101 is shut down. This terminates (or erases) the deploy virtual machine 160 of the origin server 101, and therefore a single virtual machine 160 may exist in the computer system 1. However, the computer system 1 may allow a plurality of deploy virtual machines 160 to exist therein.

Figure 9:
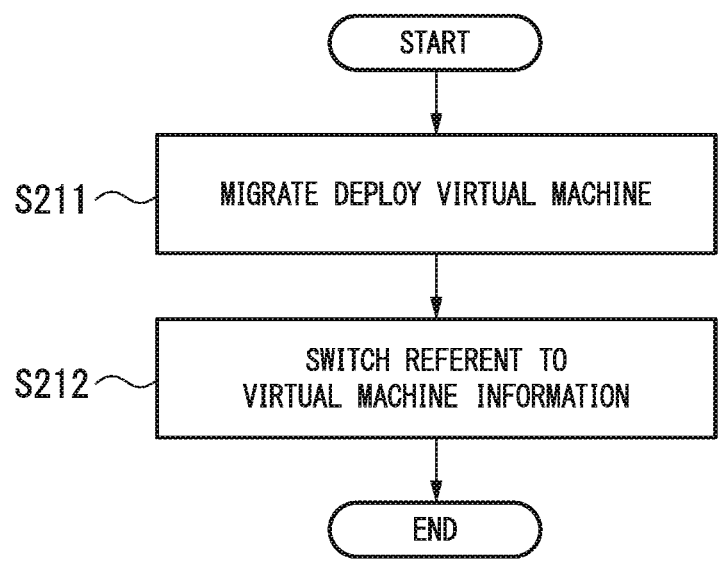
FIG. 9 is a flowchart showing the procedure for switching the deploy virtual machine from the origin server to the target server.

FIG. 9 is a flowchart showing the procedure for switching the deploy virtual machine 160 from the origin server 101 to the target server 102. In step S211, the VM manager 150 of the origin server 101 cooperates the VM manager of the target server 102 so as to switch the deploy virtual machine 160 from the origin server 101 to the target server 102. Specifically, the VM manager 150 of the origin server 101 stops the deploy virtual machine 160 of the origin server 101. Then, the VM manager 150 of the target server 102 operates the deploy virtual machine 160 of the target server 102. At this time, a destination for referring to data used to execute the deploy virtual machine 160 is the virtual machine disk 230 exported by the target server 102.

Next, the VM manager 150 of the target server 102 switches a destination of referring to data used to execute the deploy virtual machine 160 from the virtual machine disk 230 exported by the target server 102 to the virtual machine disk 230 localized in the target server 102 in step S212. After completion of step S212, the computer system 1 exits the process of FIG. 9.

Figure 10:
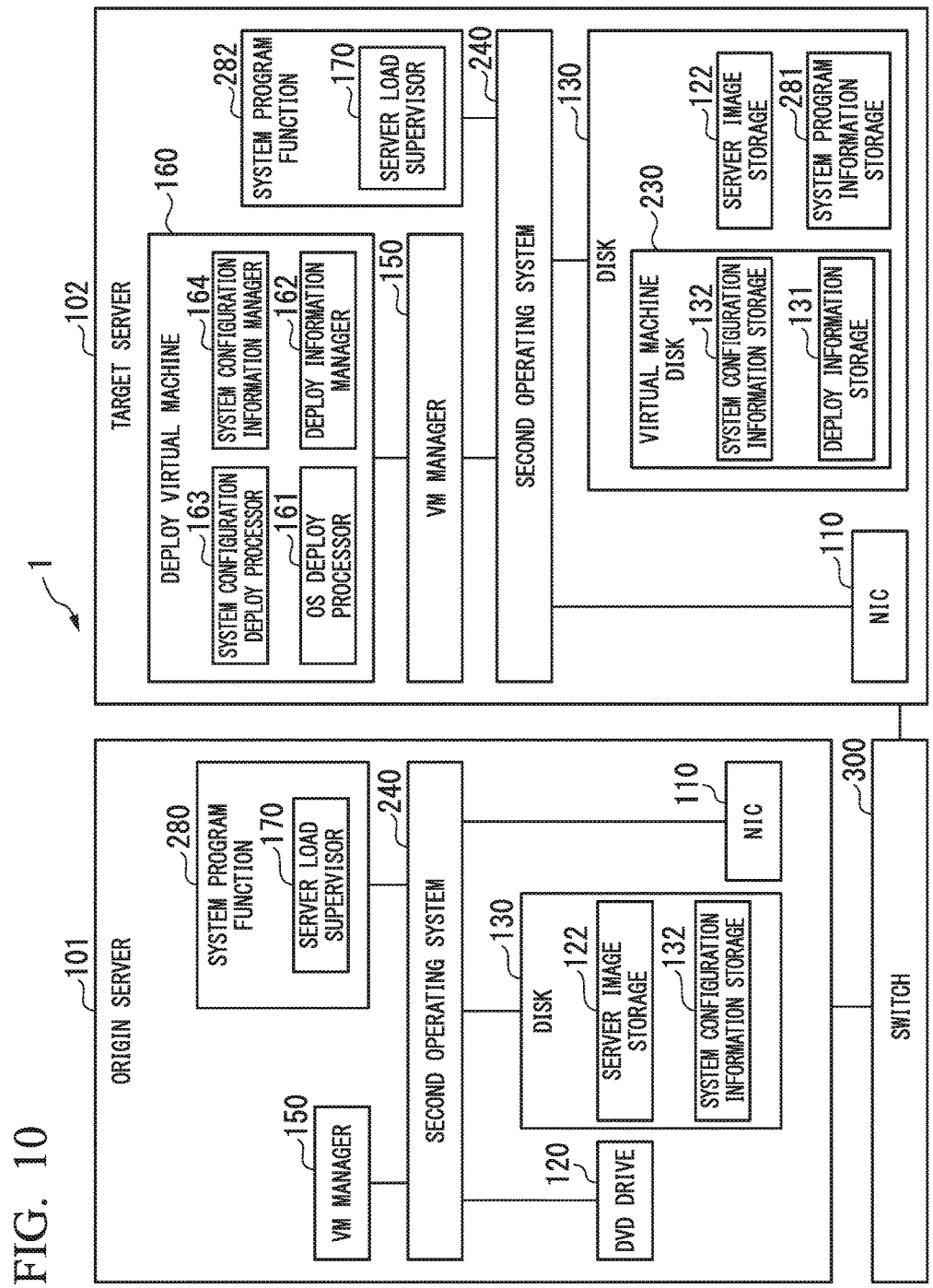
FIG. 10 is a block diagram showing an internal configuration of the origin server and an internal configuration of the target server when the target server deploys a target program to the origin server.

FIG. 10 is a block diagram showing an internal configuration of the origin server 101 and an internal configuration of the target server 102 when the target server 102 deploys a target program to the origin server 101. In FIG. 10, the target server 102 has the same configuration as the configuration of the target server 102 shown in FIG. 8; hence, constituent elements thereof are denoted using the same reference signs, and therefore descriptions thereof will be omitted. In FIG. 10, the deploy virtual machine 160 further includes an OS deploy processor 161, a deploy information manager 162, a system configuration deploy processor 163, and a system configuration information manager 164. FIG. 10 illustrates the details of the deploy virtual machine 160 as shown in FIG. 4; hence, it does not show any difference between the target server 102 of FIG. 10 and the target server 102 of FIG. 8 in terms of the configuration of the deploy virtual machine 160.

On the other hand, the origin server 101 of FIG. 10 structurally differs from the origin server of FIG. 8. That is, the origin server 101 of FIG. 10 includes the NIC 110, the DVD drive 120, the disk 130, the VM manager 150, the second operating system 240, and the system program function part 282. The disk 130 includes the server image storage part 122 and the system configuration information storage part 132. The system program function part 280 includes the server load supervisor 170.

In FIG. 10, the origin server 101 includes the NIC 110 and the DVD drive 120 which are similar to those shown in FIG. 4. However, the DVD drive 120 ejects a DVD when the origin server 101 is shut down; hence, the DVD drive 120 inhibits insertion of a DVD.

In FIG. 10, the origin server 101 includes the disk 130 (further including the server image storage part 122 and the system configuration information storage part 132), the VM manager 150, the second operating system 240, and the system program function part 280 (further including the server load supervisor 170) which are similar to the disk 130, the VM manager 150, the second operating system 240, and the system program function part 282 installed in the target server 102 shown in FIG. 5.

In FIG. 10, the deploy virtual machine 160 of the target server 102 deploys a target program to the origin server 101, and therefore the origin server 101 implements the functions achieved by the target server 102 shown in FIG. 5. This makes it possible for the origin server 101 to execute predetermined functions (e.g. providing Web services).

Figure 11:
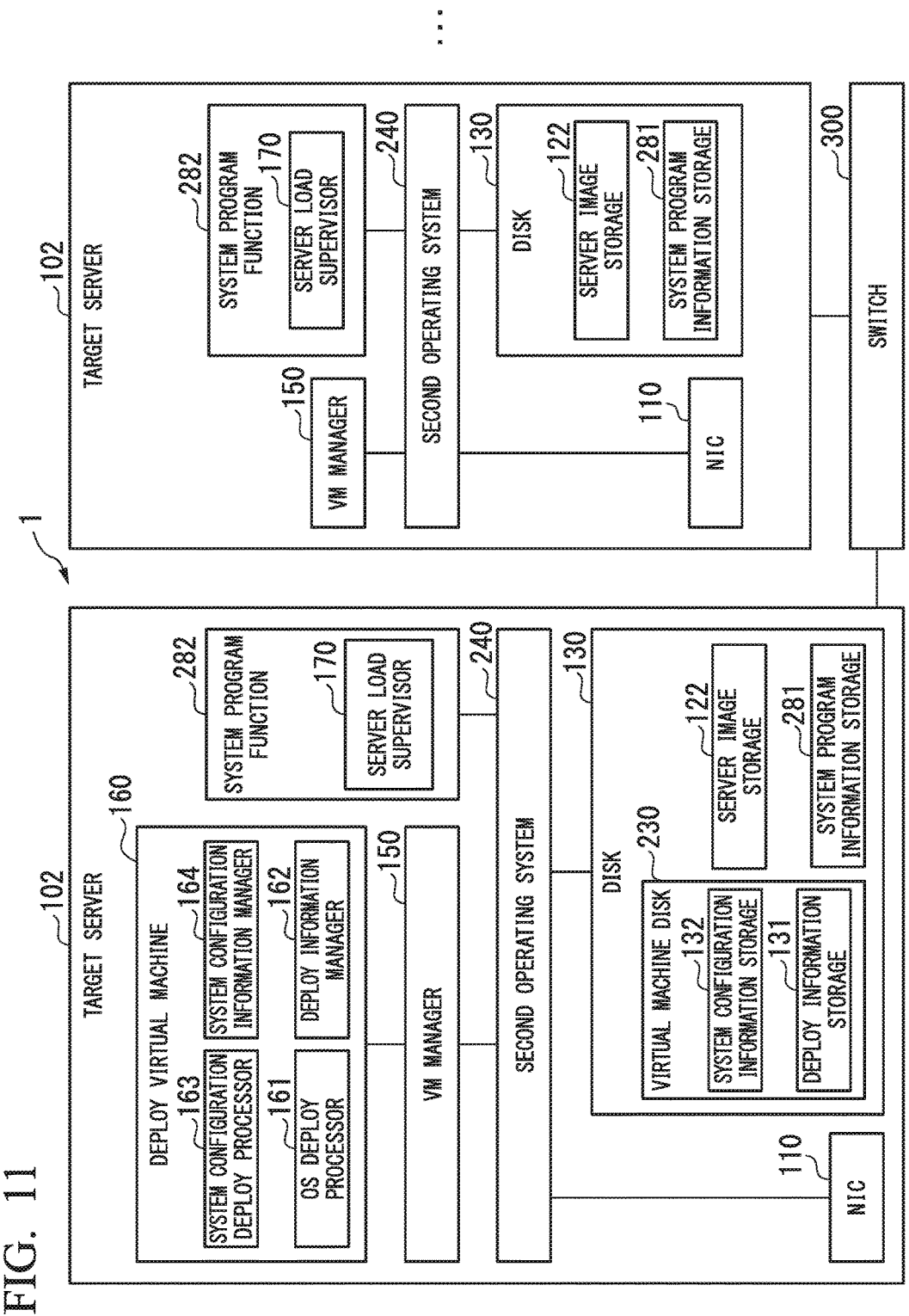
FIG. 11 is a block diagram showing internal configurations of target servers when one target server deploys a target program to another target server.

FIG. 11 is a block diagram showing internal configurations of target servers 102 when one target server 102 deploys a target program to another target server 102. In FIG. 10, the left-side target server 102 acting as a source of deployment has the same configuration as the target server 102 shown in FIG. 10; hence, constituent elements thereof are denoted using the same reference signals, and therefore descriptions thereof will be omitted. In FIG. 11, the right-side target server 101 acting as a destination of deployment has the same configuration as the target server 102 shown in FIG. 5; hence, constituent elements thereof are denoted using the same reference signs, and therefore descriptions thereof will be omitted.

The left-side target server 102 deploys a target program to the right-side target server 102, and therefore the right-side target server 102 implements the same function as the target server 102 shown in FIG. 5. Thus, the target server 102 acting as a destination of deployment is able to achieve predetermined functions (e.g. providing Web services).

As described above, the origin server 101 and the target server 102 subjected to migration of the deploy virtual machine 160 will deploy target programs to all the servers 100 installed in the computer system 1. Thus, the computer system 1 is able to deploy target programs to all the servers 100 (which need to deploy target programs) without providing a deployment-dedicated server.

Thus, the deploy virtual machine 160 deploys a target program to at least one of other servers 100. In addition, the VM manger 150 migrates the deploy virtual machine 160 to any one of other servers 100. After migration from the source server 100 to the destination server 100, the deploy virtual machine 160 carries out deployment of a target program toward the source server 100 at least one time.

For example, the deploy virtual machine 160 of the origin server 101 deploys a target program to at least one target server 102. In addition, the VM manager 150 of the origin server 101 migrates the deploy virtual machine 160 to any one of the target servers 102. After migration from the origin server 101 to the target server 102, the deploy virtual machine 160 carries out deployment of a target program toward the origin server 101 at least one time.

Thus, the computer system 1 is able to deploy target programs to all the servers 100 without providing a deployment-dedicated server. In this sense, it is possible for the computer system 1 to reduce the number of servers 100 which need to deploy target programs.

In the above, the deploy virtual machine 160 may deploy predetermined programs including OS. In other words, each target program may include OS. In deployment of OS, the server 100 having the deploy virtual machine 160 is unable to deploy a target program by itself. In this case, however, it is possible for the computer system 1 to deploy target programs to all the servers 100 by way of migration of the deploy virtual machine 160 from one server 100 to another server 100.

Specifically, the origin server 101 is able to deploy its target program after the origin server 101 migrates the deploy virtual machine 160 to the target server 102. In the situation that the deploy virtual machine 160 is transferred from the source server 100 to the destination server 100, for example, it is possible for the destination server 100 to deploy its target program before the deploy virtual machine 160 is transferred from the source server 100 to the destination server 100 or after the deploy virtual machine 160 is transferred to the source server 100.

In addition, it is possible for the VM manager 150 to transfer the deploy virtual machine 160 to any one of the target servers 102 that deploy target programs by way of the deploy virtual machine 160.

In this case, the target server 102 having the deploy virtual machine transferred thereto might have already deployed its target program; hence, it is unnecessary to further deploy a target program after the transfer of the deploy virtual machine 160.

Therefore, even when the server 100 having the deploy virtual machine 160 is unable to deploy a target program including OS, for example, it is unnecessary to further transfer the deploy virtual machine 160 to other server 100. In this sense, it is possible to comparatively simplify the process of deploying target programs to all the servers 100 installed in the computer system 1.

The VM manager 150 of the origin server 101 copies data used to execute the deploy virtual machine 160 to the target server 102 acting as a destination of the deploy virtual machine 160. In addition, the VM manager 150 of the origin server 101 switches a destination of referring to data used to execute the deploy virtual machine 160 to data copied to the target server 102 acting as a destination of the deploy virtual machine 160.

In the present embodiment, a destination of referring to data used to execute the deploy virtual machine 160 is held inside the target server 102 acting as a destination of the deploy virtual machine 160. Thus, it is possible to smoothly switch a reference destination after completion of the live migration of the deploy virtual machine 160.

In this connection, the server 100 suffering from a high load to execute the deploy virtual machine 160 may transfer the deploy virtual machine 160 to the other server 100.

Figure 12:
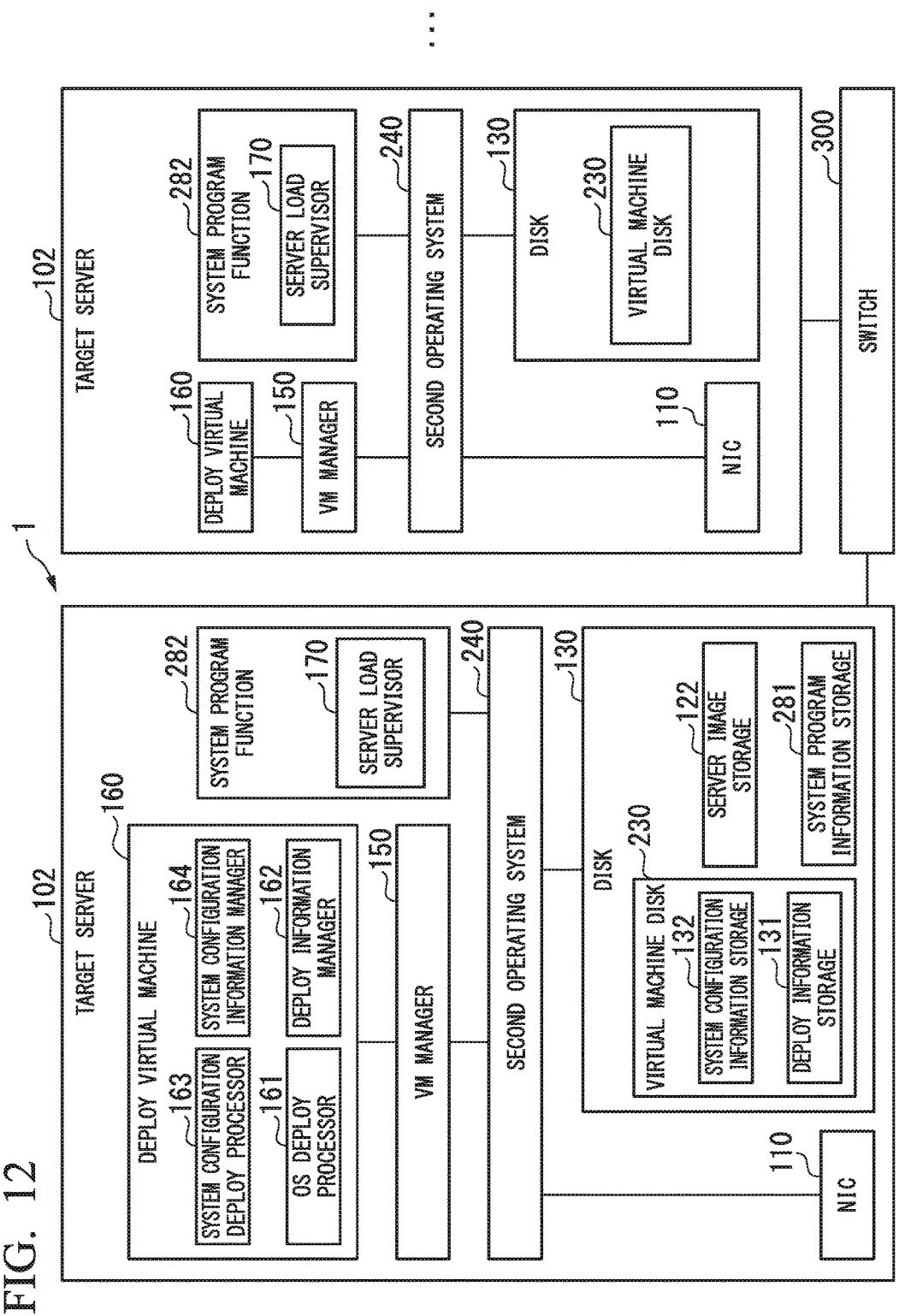
FIG. 12 is a block diagram showing internal configurations of target servers during a migration process for transferring a deploy virtual machine from one target server to the other target server based on its load.

FIG. 12 is a block diagram showing internal configurations of target servers 102 during a migration process that one target server 102 executing the deploy virtual machine 160 is transferring the deploy virtual machine 160 to the other target server 102 based on its load. In FIG. 12, the left-side target server 102 (i.e. the source target server 102 acting as a source of deployment) has the same configuration as that of the left-side target server 102 shown in FIG. 11; hence, constituent elements thereof are denoted using the same reference signs, and therefore descriptions thereof will be omitted.

In FIG. 12, the right-side target server 102 (i.e. the destination target serve 102 acting as a destination of deployment) has the same constituent elements as those of the right-side target server 102 shown in FIG. 11; hence, those constituent elements are denoted using the same reference signs, and therefore descriptions thereof will be omitted. Compared with the right-side target server 102 shown in FIG. 11, the destination target server 102 shown in FIG. 12 further includes a deploy virtual machine 160 while including a virtual machine disk 230 in the disk 130.

The server load supervisor 170 of the target server 102 executing the deploy virtual machine 160 measures a load of the target server 102. In this connection, the server load supervisor 170 does not necessarily measures loads but may measure information relating to the magnitude of loads. For example, the server load supervisor 170 may detect the number of virtual machines implemented by the server 100. As the claim language, the server load supervisor 170 represents a load-related information acquisition part.

In the following description, the information relating to the magnitude of loads of the server 100 will be referred to as load information. The load information may be quantitative information that can be represented using numbers. Alternatively, the load information may be qualitative information such as ON/OFF information.

When the server load supervisor 170 of the target server 102 executing the deploy virtual machine 160 determines that the load of the target server 102 is equal to or higher than a predetermined threshold, the server load supervisor 170 compares the load of the target server 102 with the load of the other target server 102. In the other target server 102, the server load supervisor 170 measures the load of the other target server 102 so as to transmit the load information to the target server 102 executing the deploy virtual machine 160 via the NIC 110.

When the server load supervisor 170 of the target server 102 executing the deploy virtual machine 160 selects (or detects) the other target server 102 whose load is lower than the measured load thereof, the VM manager 150 of the target server 102 executing the deploy virtual machine 160 carries out migration of the deploy virtual machine 160 towards the other target server 102 selected (or detected) by the server load supervisor 170. As the claim language, the server load supervisor 170 represents a server selecting part.

As described above, the servers 100 included in the computer system 1 acquire load information (concerning the magnitude of loads thereof) with the server load supervisors 170.

When the server load supervisor 170 indicates the load information of the server 100 higher than a predetermined threshold or condition, the server load supervisor 170 selects any one of other servers 100 based on their load information. Then, the VM manager 150 of the server 100 executing the deploy virtual machine 160 transfers the deploy virtual machine 160 to the other server 100 selected by the server load supervisor 170.

In the above, the present embodiment is designed such that the deploy virtual machine 160 is transferred from one server 100 having a high load to the other server 100 having a low load. This may alleviate the concentration of loads toward a specific server 100. In this sense, it is possible to reduce the probability concerning the occurrence of servers 100 suffering from excessive loads.

In this connection, the deploy virtual machine 160 (in particular, the system configuration deploy processor 163 and the system configuration information manager 164) may manage a system program and its configuration during the deployment of a target program and after completion of deployment (i.e. the time period that the computer system 1 is operating to achieve a predetermined function).

For example, a user may create system information, such as the configuration of a system program, so as to store the system information on the system configuration information storage part 132. In this case, the system configuration information manager 164 is able to read the system information from the system configuration information storage part 132. Then, the system configuration deploy processor 163 deploys the system information (which is read by the system configuration information manager 164) to the other server 100.

Thus, it is possible to manage a system program and its configuration since the deploy virtual machine 160 deploys the system information from one server 100 to the other server 100. In this case, however, it is preferable that the computer system 1 include a single deploy virtual machine 160. This makes it easy for the computer system 1 to manage the version of a system program and its configuration.

Figure 13:
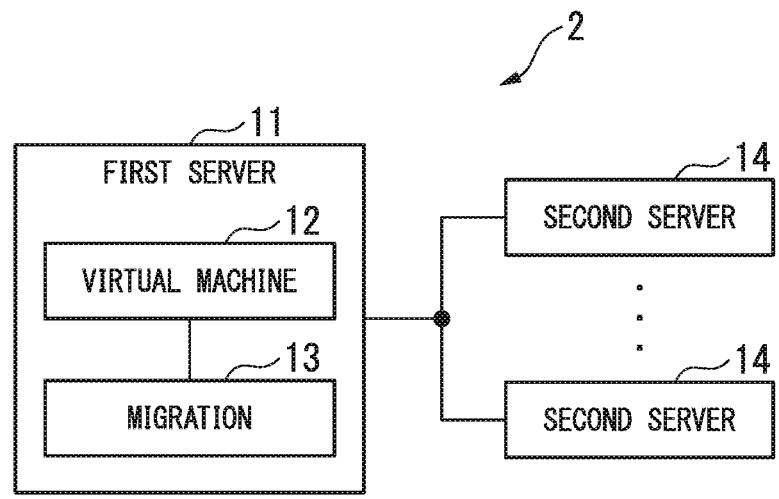
FIG. 13 is a block diagram showing the minimum configuration of a server system according to the present invention.

Next, the minimum configuration concerning a server system 2 and a server 21 according to the present invention will be described with reference to FIGS. 13 and 14. FIG. 13 is a block diagram showing the minimum configuration of the server system 2, which includes a first server 11 and at least one second server 14. The first server 11 includes a virtual machine 12 and a migration part 13.

In FIG. 13, the virtual machine 12 carries out an execution-facilitating process for facilitating at least one second server 14 to deploy a predetermined program in an executable condition. Then, the migration part 13 migrates the virtual machine 12 to any one of the second servers 14. After migration of the virtual machine 12 from the first server 11 to the second server 12, the virtual machine 12 carries out an execution-facilitating process for facilitating the first server 11 to deploy a predetermined program in an executable condition at least one time.

Thus, the server system 2 is able to carry out execution-facilitating process with all the servers included in the server system 2 without providing a specific server dedicated to an execution-facilitating process. In this sense, it is possible for the server system 2 to reduce the number of servers subjected to execution-facilitating processes.

Figure 14:
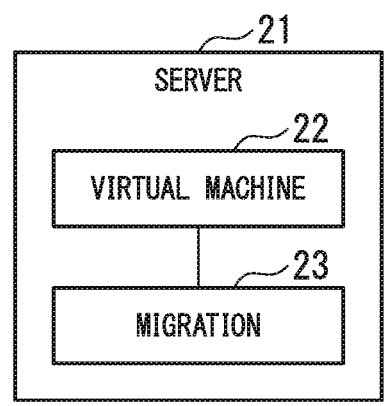
FIG. 14 is a block diagram showing the minimum configuration of a server according to the present invention.

FIG. 14 is a block diagram showing the minimum configuration of the server 21, which includes a virtual machine 22 and a migration part 23. The virtual machine 22 carries out an execution-facilitating process for facilitating at least one of other servers to deploy a predetermined program in an executable condition. Then, the migration part 23 migrates the virtual machine 22 to any one of other servers. After migration of the virtual machine 22 from the source server to the destination server, the virtual machine 22 carries out an execution-facilitating process for facilitating the source server to deploy a predetermined program in an executable condition at least one time.

Thus, the server system using the server 21 is able to carry out execution-facilitating processes with all the servers without providing a specific server dedicated to an execution-facilitating process. In this sense, it is possible for the server system using the server 21 to reduce the number of servers subjected to execution-facilitating processes.

In the foregoing embodiment, it is possible to record computer programs, achieving part of or the entirety of the functionality of the origin server 101 on computer-readable storage media such as DVD, wherein a computer system loads programs stored on computer-readable storage media so as to execute computer programs, thus implementing function parts. Herein, the term "computer system" may embrace software (e.g. OS) and hardware (e.g. peripheral devices).

The term "computer-readable storage media" refers to flexible disks, magneto-optical disks, ROM, portable media such as CD-ROM, and storage devices such as hard disks installed in computer system. The computer programs may achieve part of the foregoing functionality. Alternatively, the computer programs may be differential programs or differential files which can be combined with pre-installed programs of computer systems so as to achieve the foregoing functionality.

For example, a computer-readable storage medium causing a computer acting as a server to implement an execution-facilitating method adapted to a server system including a first sever and at least one second server, comprising the steps of: executing a virtual machine with the first server, carrying out an execution-facilitating process for facilitating the second server to deploy a predetermined program in an executable condition with the virtual machine; migrating the virtual machine from the first server to the second server; after migration, operating the virtual machine to carry out the execution-facilitating process for facilitating the first server to deploy the predetermined program in the executable condition.

Lastly, the present invention is not necessarily limited to the foregoing embodiment, which can be modified in various ways within the scope of the invention as defined by the appended claims.

What is claimed is:

1. A server system comprising: a first server including: a first memory storing first instructions; and a first processor configured to execute the first instructions; and at least one second server including: a second memory storing second instructions; and a second processor configured to execute the second instructions, wherein the first processor is further configured to execute the first instructions to:

facilitate, by a virtual machine, the second server to deploy a predetermined program to set up a virtual-machine executing environment in an executable condition; and migrate the virtual machine to the second server after facilitating the second server to deploy the predetermined program, wherein after migration of the virtual machine from the first server to the second server, the virtual machine facilitates the first server to deploy the predetermined program in the executable condition at least one time, and the predetermined program includes an operating system to be deployed in the executable condition.

2. A server system comprising: a first server including: a first memory storing first instructions; and a first processor configured to execute the first instructions; and at least one second server including: a second memory storing second instructions; and a second processor configured to execute the second instructions, wherein the first processor is further configured to execute the first instructions to:

facilitate, by a virtual machine, the second server to deploy a predetermined program to set up a virtual-machine executing environment in an executable condition;

migrate the virtual machine to the second server after facilitating the second server to deploy the predetermined program, wherein after migration of the virtual machine from the first server to the second server, the virtual machine facilitates the first server to deploy the predetermined program in the executable condition at least one time;

deploy the predetermined program to the second server from the first server by transmitting a server image of the first server to the second server in an executable condition;

copy system configuration information and deploy information of the first server to the second server; and terminate the deployed virtual machine in the first server while activating the deployed virtual machine on the second server.

3. A server comprising: a memory storing instructions; and a processor configured to execute the instructions to:

facilitate, by a virtual machine, at least one secondary server to deploy a predetermined program to set up a virtual-machine executing environment in an executable condition;

migrate the virtual machine to the secondary server after deploying the predetermined program, wherein after migration of the virtual machine to the secondary server, the virtual machine facilitates the server to deploy the predetermined program in the executable condition at least one time;

deploy the predetermined program to the second server from the first server by transmitting a server image of the first server to the second server in an executable condition;

copy system configuration information and deploy information of the first server to the second server; and terminate the deploy virtual machine in the first server while activating the deploy virtual machine on the second server.

4. An execution-facilitating method for a server system including a first server including a first memory and a first processor and a second server including a second memory and a second processor, the method comprising:

executing, at the first server, a virtual machine;

facilitating the second server to deploy a predetermined program to set up a virtual-machine executing environment in an executable condition with the virtual machine;

migrating the virtual machine from the first server to the second server after deploying the predetermined program;

after migration, operating the virtual machine to facilitate the first server to deploy the predetermined program in the executable condition;

deploying the predetermined program to the second server from the first server by transmitting a server image of the first server to the second server in an executable condition, implementing preprocessing by copying system configuration information and deploy information of the first server to the second server; and implementing live migration by terminating the deploy virtual machine in the first server while activating the deploy virtual machine on the second server.

* * * * *

UNITED STATES PATENT AND TRADEMARK OFFICE
CERTIFICATE OF CORRECTION

PATENT NO. : 10,467,047 B2
APPLICATION NO. : 15/448940
DATED : November 5, 2019
INVENTOR(S) : Atsushi Tsuji Page 1 of 1

It is certified that error appears in the above-identified patent and that said Letters Patent is hereby corrected as shown below:

Claim 3, Column 18, Line 51, "from the first server by" should read --by--.

Claim 3, Column 18, Line 55, "the first server" should read --the server--.

Signed and Sealed this
Seventh Day of April, 2020

Andrei Iancu
*Director of the United States Patent and Trademark Office*